United States Patent
Oggerino et al.

(10) Patent No.: US 7,233,934 B1
(45) Date of Patent: Jun. 19, 2007

(54) DYNAMIC EXPERT SYSTEM

(75) Inventors: Christopher Paul Oggerino, Los Gatos, CA (US); William Eugene Gunnther Hamilton, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 483 days.

(21) Appl. No.: 10/454,907

(22) Filed: Jun. 4, 2003

(51) Int. Cl.
*G06N 5/00* (2006.01)
*G06N 3/08* (2006.01)

(52) U.S. Cl. .............................. 706/47; 706/46; 706/61

(58) Field of Classification Search .................. 706/47
See application file for complete search history.

(56) References Cited

OTHER PUBLICATIONS

Zhengxin Chen, Building Expert Systems Through The Integration Of Mental Models, 1988, ACM, pp. 754-761.*

Stuart C. Shapiro, NETL: A System for Representing and Using Real-World Knowledge, American Journal of Computational Linguistics, vol. 6, No. 3-4, Jul.-Dec. 1980.*

* cited by examiner

*Primary Examiner*—Anthony Knight
*Assistant Examiner*—Nathan H. Brown, Jr.
(74) *Attorney, Agent, or Firm*—Marger Johnson & McCollom, P.C.

(57) ABSTRACT

Embodiments of the present invention provide a dynamic expert system comprising a control database, a master rules database, an operations database, an initialization module, a dynamic knowledge module and an application of knowledge module. The control database comprises a plurality of available data structures. The master rules database comprises one or more of the available data structures populated with a plurality of rules. The initialization module causes one or more of the available data structures and corresponding rules to be copied, as a project/product database, to the operations module. The dynamic knowledge module provides for modifying the data structure, rules and/or operating parameters to be captured of the project/product database. The application of knowledge module provides for applying the modifiable project/product database to the project, product or the like.

18 Claims, 5 Drawing Sheets

DYNAMIC EXPERT SYSTEM

FIELD OF THE INVENTION

Embodiments of the present invention relate to expert systems, and more particularly to an expert system providing a dynamic best-known process.

BACKGROUND OF THE INVENTION

Modern businesses are utilizing expert system to manage schedules, reduce costs, and improve products and services, and/or the like. Referring to FIG. 1, a block diagram of an expert system according to the conventional art is shown. As depicted in FIG. 1, the expert system comprises a rules engine and a database of knowledge. The expert system is utilized to control the plurality of processes that comprise a project, product or the like. A rules engine of the expert system applies a knowledge base, contained in the database, according to a set of rules.

Conventional art expert systems are problematic in that the best-known processes are static. Currently, expert systems allow a user to modify the organization of knowledge. However, if the user is able to modify the organization of knowledge, the expert system is unable to provide for the collection of operating parameters during execution of the project, process or the like. Alternatively, if the system is able to collect operating parameters then the user cannot modify the organization of the knowledge.

SUMMARY OF THE INVENTION

Embodiments of the present invention provide a dynamic expert system comprising a best-known process for a given project, product or the like. In one embodiment of the present invention, the expert system comprises a control database, a master rules database, an operations database, an initialization module, a dynamic knowledge module and an application of knowledge module. The control database comprises a plurality of available data structures. The master rules database comprises one or more of the available data structures populated with a plurality of rules. The initialization module causes one or more of the available data structures and corresponding rules to be copied, as a project/product database, to the operations module. The dynamic knowledge module provides for modifying the data structure, rules and/or operating parameters to be captured of the project/product database. The application of knowledge module provides for applying the modifiable project/product database to the project, product or the like.

In another embodiment of the present invention, a method of dynamically acquiring and applying a best-known process is provided. The method of dynamically acquiring and applying a best-know process comprises populating an available one of a plurality of data structures with a plurality of corresponding rules. The populated data structure and corresponding rules are copied such that a project/product database is created. The method further comprises the ability to add, delete or change portions of the data structure of the project/product database, one or more rules of the project/product database, and/or operating parameters to be captured by the project/product database. The method further comprises invoking the project database as modified to control the applicable project, product or the like.

Accordingly, embodiments of the present invention advantageously provide a dynamically customizable expert system that is able to acquire and apply best-known processes to products, projects and the like. Embodiments of the present invention also advantageously provide a continuous improvement loop wherein knowledge acquired during execution of a product or process adds to the master rules database.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
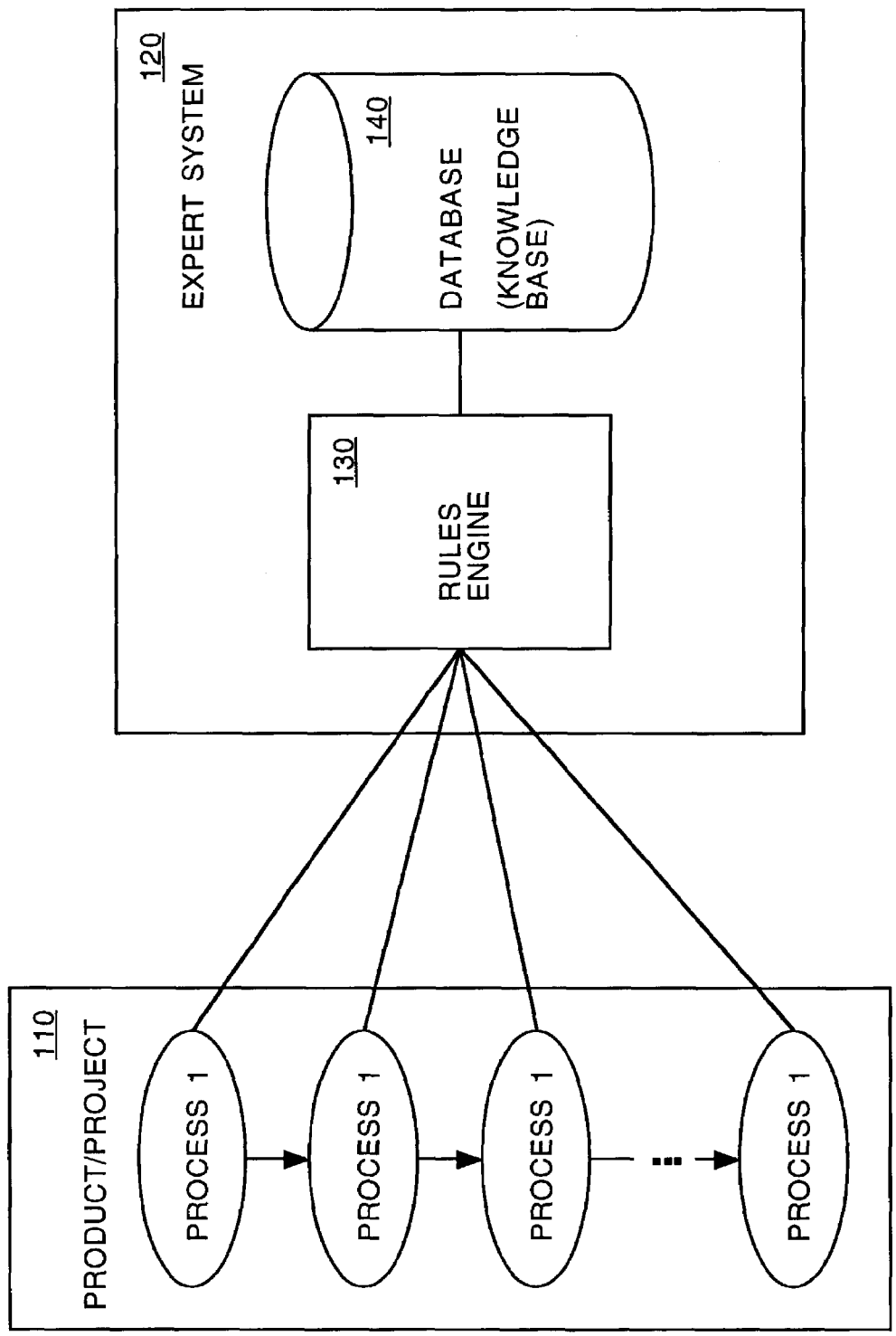
FIG. 1 shows a block diagram of an expert system according to the conventional art.
Figure 2:
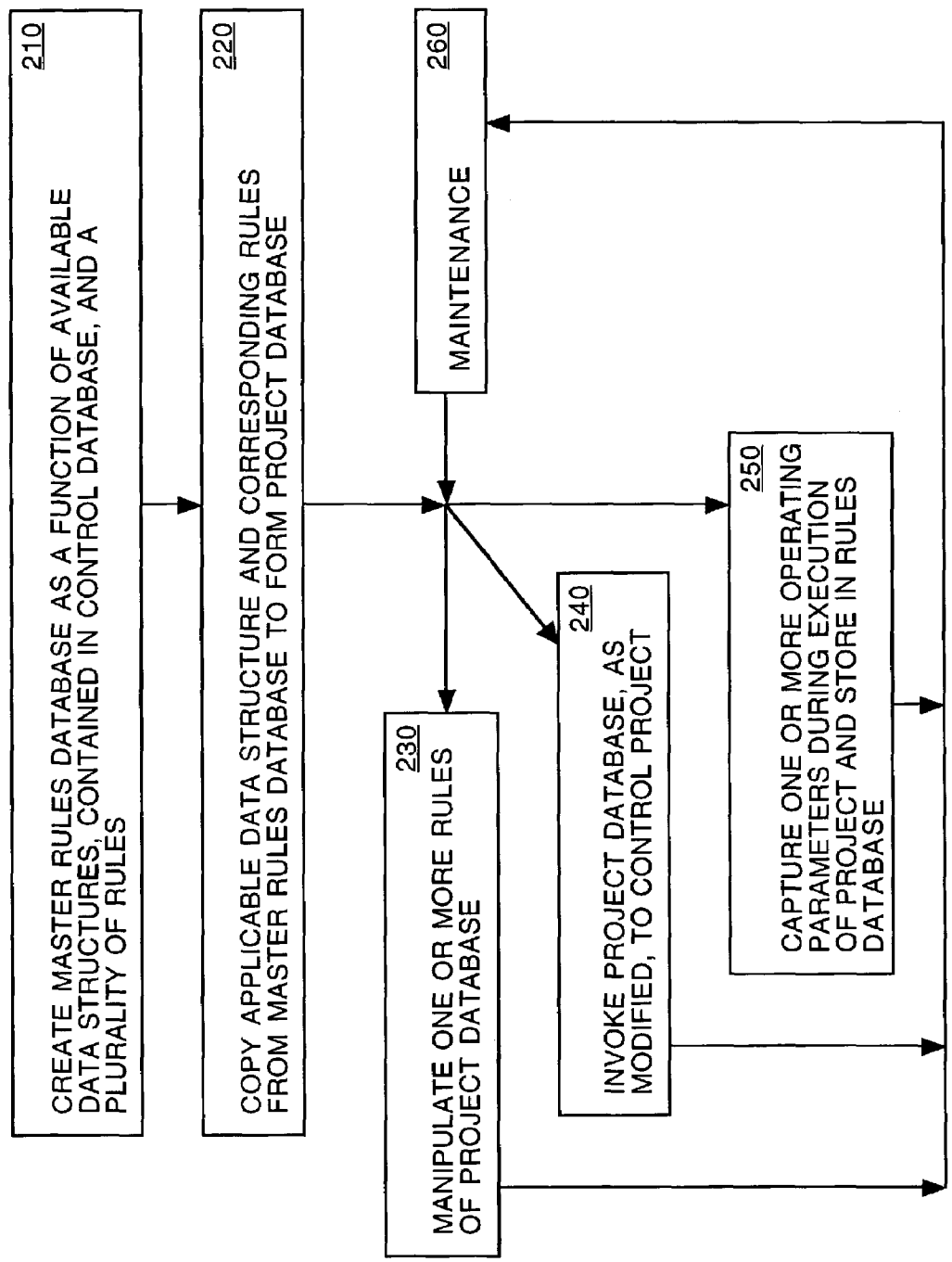
FIG. 2 shows a flow diagram of a method of dynamically acquiring and applying a best-know process, in accordance with one embodiment of the present invention.

Referring now to FIG. 2, a flow diagram of a method of dynamically acquiring and applying a best-know process, in accordance with one embodiment of the present invention, is shown. As depicted in FIG. 2, the method begins with creating a master rules database as a function of one or more available data structures, contained in a control database, and a plurality of rules, at step 210. Accordingly, the master rules database comprises one or more data structures. Each data structure is populated with a plurality of corresponding rules. In one implementation, the entire data structure is populated with rules at the time of creation. In another implementation, portions of the data structure are populated with rules prior to initiation of the corresponding phase of the project, product or the like. Thus, the master rules database comprises the latest and greatest best-known processes for the particular phase as a result of the just-in-time incorporation of the rules.

At step 220, one of the plurality of data structures, applicable to a project, product or the like, and the corresponding rules are copied from the master rules database to form a project/product database. (The project/product database is referred to as a "project database" in the claims.) Upon creating the project/product database, a user may also specify a header description comprising a name of the project, product or the like (referred to as a "project" in the claims), and one or more categorizations such as timing, technology and the like.

At step 230, the user may manipulate the data structure and/or rules of the project/product database. The user may add, delete or modify one or more portions of the data structure and/or add, delete or modify one or more rules therein. Furthermore, a given rule may call for the entry of one or more operating parameters. Accordingly, by manipulating a rule the user may change one or more operating parameters to be captured. Accordingly, the populated project/product database, as manipulated, comprises the best-known processes for the particular project, product or the like.

At step 240, the project/product database, as modified, is invoked to control the project, process or the like. Hence, the best-know process is applied to the given project, process or the like.

At step 250, one or more operating parameters may be captured during execution of the project, process or the like. The operating parameters comprise a means of measuring and tracking results.

Figure 3:
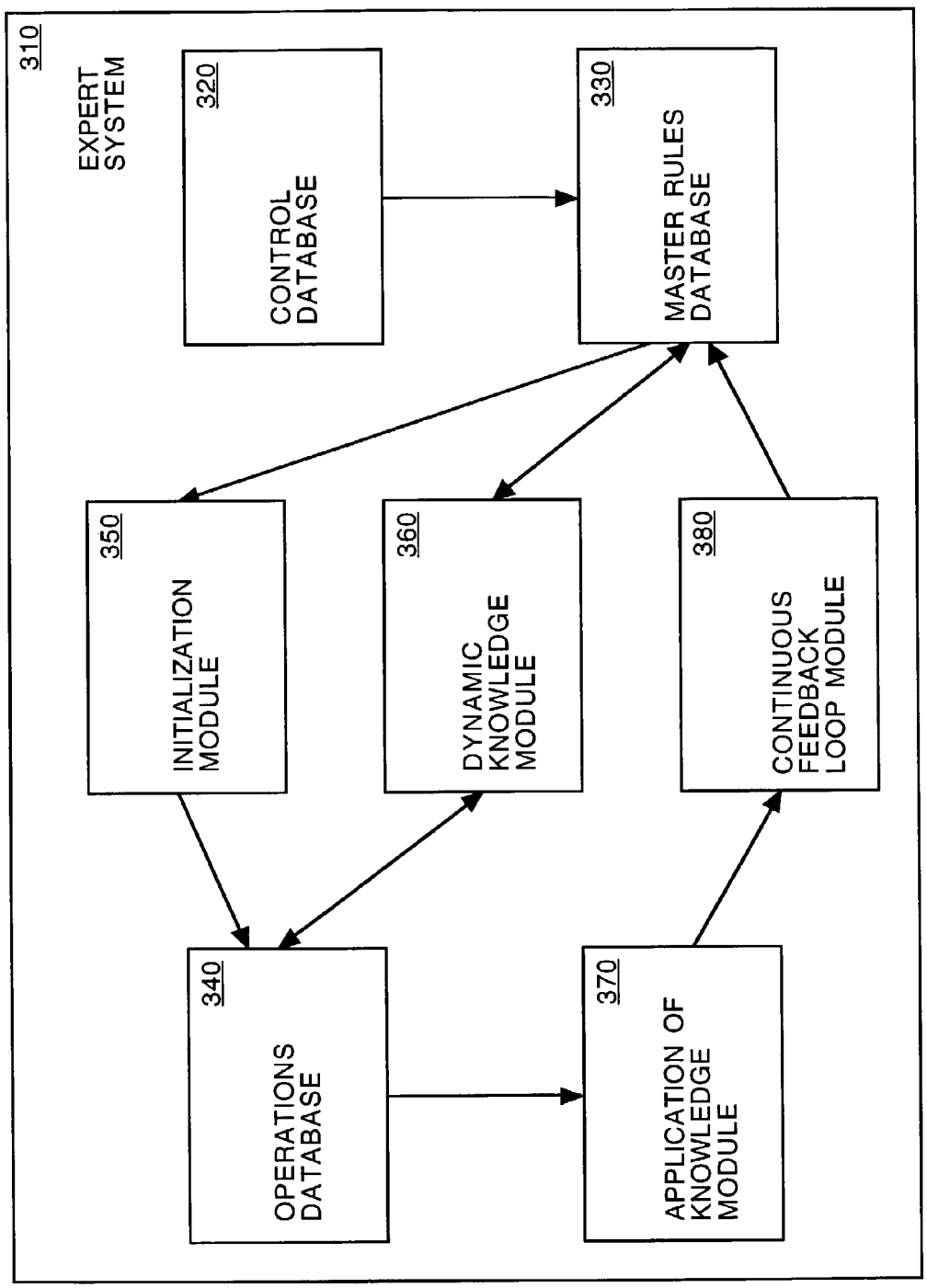
FIG. 3 shows a block diagram of an expert system, in accordance with one embodiment of the present invention.

Two or more of steps 230, 240 and 250 may be performed sequentially, substantially simultaneously with each other and/or in any combination thereof. Furthermore, one or more steps 230, 240 and/or 250 may be repeated as part of a maintenance process, at step 260. Accordingly, the data structure and the rules of the project/product database remain modifiable throughout execution of the project, product or the like Referring now to FIG. 3, a block diagram of an expert system 310, in accordance with one embodiment of the present invention, is shown. As depicted in FIG. 3, the expert system 310 comprises a control database 320, a master rules database 330, an operations database 340, an initialization module 350, a dynamic knowledge module 360 and an application of knowledge module 370. The control database 320, the rules database 330 and the operations database 340 comprise hierarchical databases.

The control database 320 is communicatively coupled to the master rules database 330. The initialization module 350 is communicatively coupled between the master rules database 330 and the operations database 340. The dynamic knowledge module 360 is communicatively coupled between the master rules database 330 and the operations database 340. The operations database 340 is communicatively coupled to the application of knowledge module 370.

The control database 320 comprises a plurality of available data structure. The master rules database 330 comprises a plurality of rules applicable to each of the plurality of available data structures contained in the control database 320. Users are limited in their ability to modify the rules database 330 based on the control database 320 and it's controlling plurality of available data structures. Modifying the rules database 330 may comprise adding deleting, changing or the like, the rules, the data structure or the like, of the rules database 330.

When a project, product or the like is started, the initialization module 350 causes a desired one of the plurality of data structures along with applicable rules to be copied from the master rules database 330 to the operations database 340. Accordingly, a product/project database is formed in the operations database 340. In one implementation, the function provided by the initialization module is initiated upon specification of a header description comprising a name of a project, product or the like, by a user. The applicable rules are determined according to timing, technology and the like categorizations specified in the header description. Furthermore, specifying a particular project, product or the like for each instance allows the operations database to contain a plurality of project/product database for the control of a plurality of corresponding project, product or the like.

The dynamic knowledge module 360 allows the user to manipulate one or more portions of the data structure and/or one or more rules within the product/project database. The user may also specify that the rules should apply to the master rules database. Accordingly, the product/project database, as manipulated, comprises a collection of knowledge of the best-known processes applicable to the particular product, project or the like.

The product/project database, contained in the operations database 340, may be applied to control the product, project or the like according to the best-known processes. The application of knowledge module 370 applies the best-known process in accordance with the product/project database to the given product, project or the like. The operations database 340 also provides for the capture of operating parameters for tracking and measuring results, via the application of knowledge module 370. Hence, the operations database 340 comprises a database, for collecting operating parameters, within a database, for storing rules, within a database, for storing the project/product data structure. In one implementation, the database for storing the operating parameters is an XML database or the like. The databases for storing the rules and the data structure are each an Oracle database or the like.

Modification of the product/project database by the dynamic module, application of the best-known process contained in the operations database by the application of knowledge module and/or capture of operating parameters by the application of knowledge module may be performed sequentially, substantially simultaneously with another, or some combination thereof.

Figure 4:
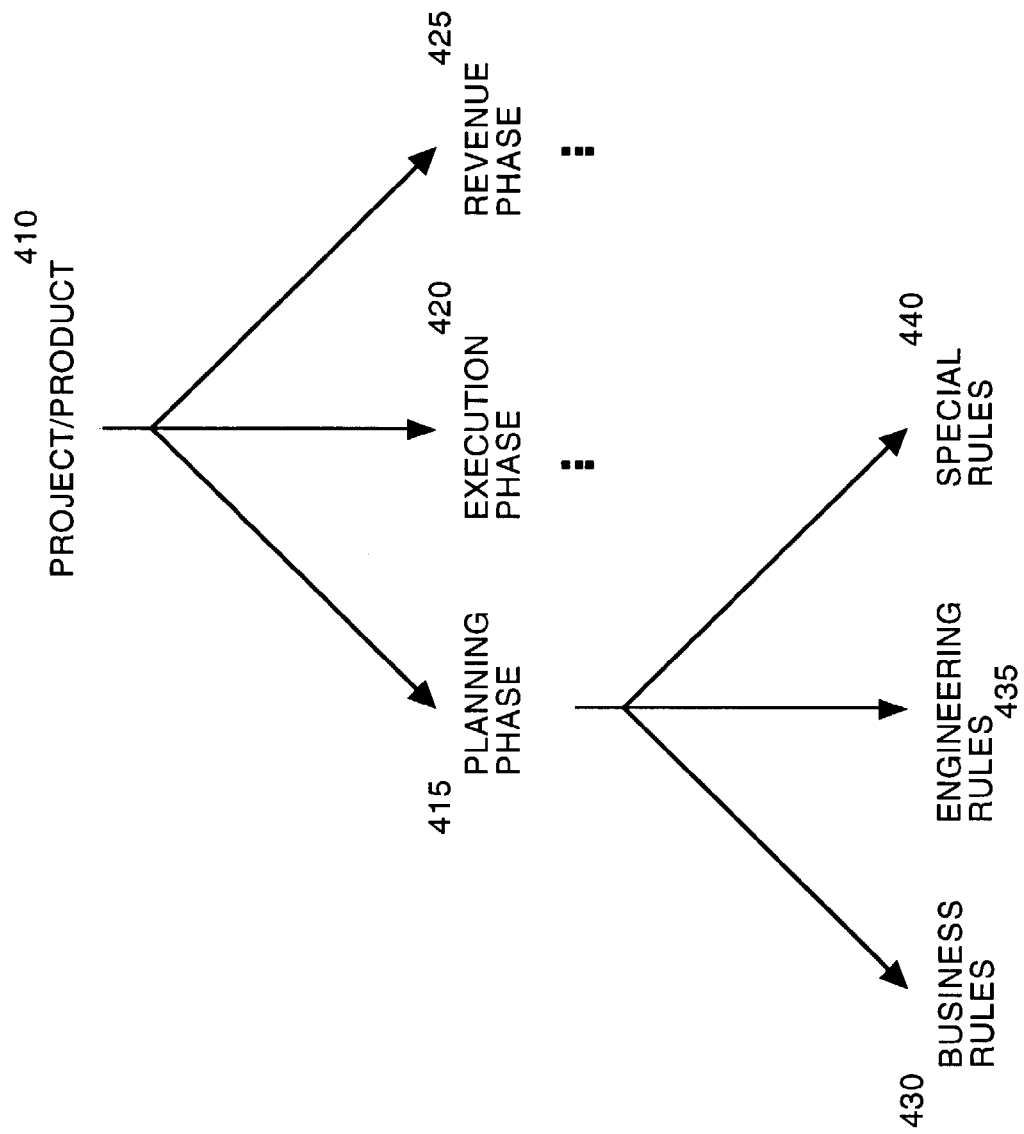
FIG. 4 shows an exemplary representation of a data structure of a control database or operations database, in accordance with one embodiment of the present invention.

Referring now to FIG. 4, an exemplary representation of a data structure 400 of a master rule database 330 or operation database 340, in accordance with one embodiment of the present invention, is shown. As depicted in FIG. 4, the data structure comprises an organization of knowledge. For example from the project level 410 a project may comprise a planning phase 415, an execution phase 420, revenue phase 425 and/or the like. Within the planning phase 415, there may be one or more business rules 430, one or more technical rules 435, one or more special rules 440 and/or the like. The business rules 430 may comprise, for example, "marketing must provide a description of a target customer and their skill set". The links represent the data structure. Together, the data structure and the rules comprise the best-known process.

Associated with each rule, are one or more categorizations. The categorizations may comprise who cares, why they care, when they care, and/or the like. For example, a rule concerning a forecast may have categorization associated with it that state who cares about a forecast, why they care about a forecast, and when a forecast should be performed and/or the like. For each rule, there may also be an explanation of the rule associated therewith. In one implementation, the explanation may comprise a white paper. Associated with each rule, there may also be one or more operating parameters to be captured for the project or product.

Referring back to FIG. 3, the expert system 310 may further comprise a continuous feedback loop module 380 communicatively coupled between the application of knowledge module 370 and the master rules database 320. Upon application of the project/product database to control the product, process or the like, additional knowledge may be gained. The knowledge is learned from the application of the expert system 310 to the product, process or the like. The continuous feedback loop module 380 comprises acquiring the knowledge that has been learned from the one or more modifications made when creating the project/product database and the operating parameters captured. Knowledge can also be assimilated from other information, such as a white paper, customer feedback and/or the like. The knowledge is then categorized and incorporated into the master rules database 330. The continuous feedback loop module 380 provides for incorporating knowledge for projects having the same attributes as those from which the knowledge is gained. Thus, the system acquires and distributes knowledge gained from the application of the rules to the project, product or the like.

Figure 5:
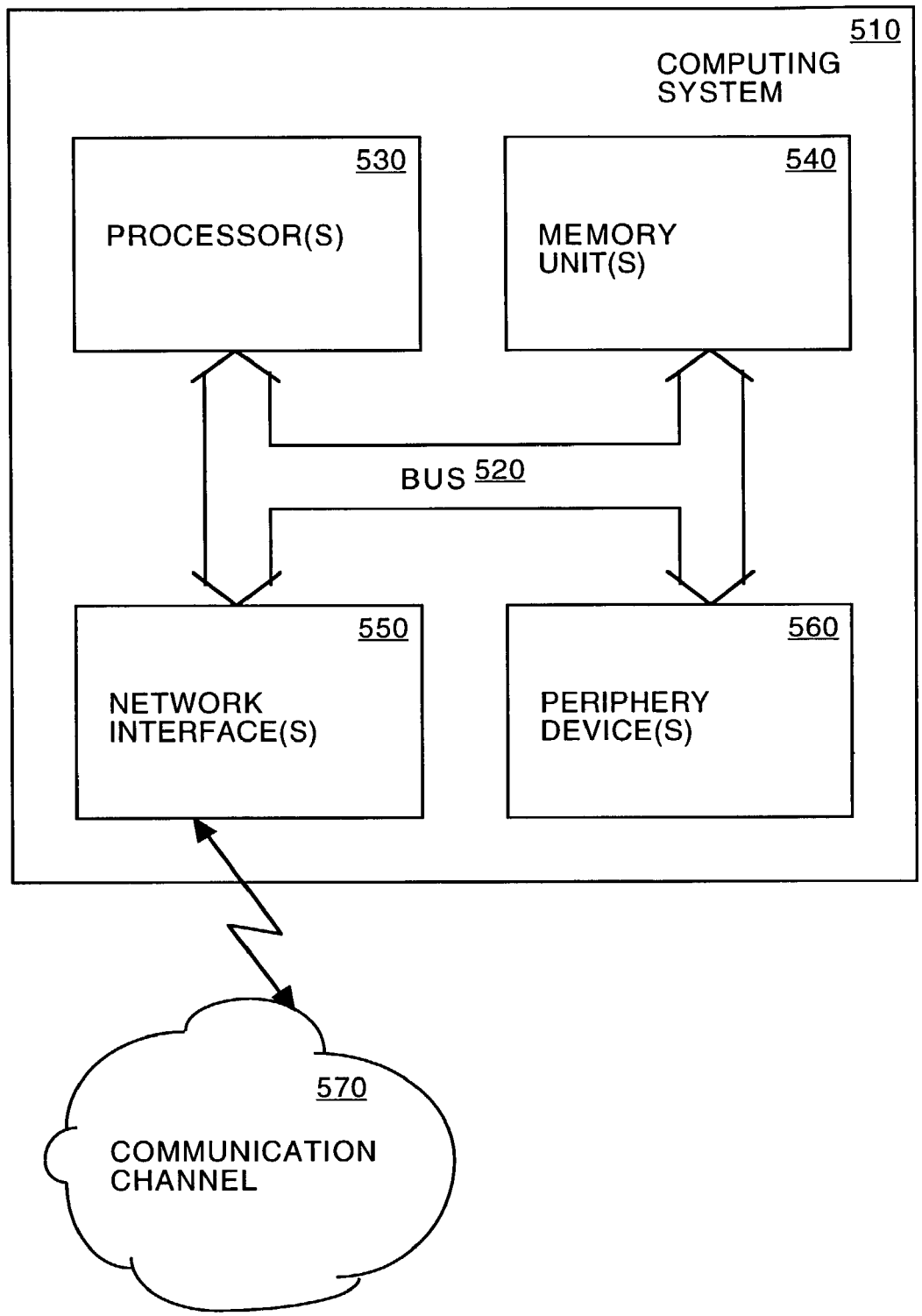
FIG. 5 shows a block diagram of an exemplary computing system for implementing embodiments of the present invention.

Referring now to FIG. 5, a block diagram of an exemplary computing system 510 for implementing embodiments of the present invention is shown. The computing system 510 may comprise a Sun Microsystems server, or the like. Although the computing system 510 is shown as a stand-alone system, it is also appreciated that the computing system can readily be implemented as a distributed computing system. An exemplary distributed computing system may comprise a database server, an application server, a client device, a web-enabled device, and/or the like. As depicted in FIG. 5, the computing system 510 comprises an address/data bus 520 for communicating information and instructions. One or more processors 530 are coupled with the bus 520 for processing information and instructions. A memory unit 540 is also coupled to the bus 520 for storing information and instructions for the processor(s) 530. The memory unit 540 may include volatile memory (e.g. random access memory, static RAM, dynamic RAM, and the like), non-volatile memory (e.g. read only memory, programmable ROM, flash memory, EPROM, EEPROM, and the like), mass data storage (e.g. hard disk, optical disk, floppy disk, and the like), and the like.

The computing system 510 also includes one or more network interface cards (NIC) 550 coupled to the bus 520. The NIC 550 provides for communicating with other computing systems across a communication channel 560. The computing system 510 also includes one or more peripheral devices 570 (e.g. display, keyboard, pointing device, speaker, and the like) coupled to the bus 520.

Certain processes and steps of the present invention are realized as one or more series of instructions (e.g. code) that reside on a computer-readable medium, such as the memory unit 540, and are executed by the processor 530. When executed, one series of instructions cause the processor 530 to provide an operating system, such as UNIX, Sun Microsystems' Solaris or the like. Another series of instructions cause the processor 530 to provide a database application such as Oracle's 9i/DB, providing support for java, HTML, and XML, or the like. Another series of instructions cause the processor 530 to provide a web browser application such as Microsoft's Internet Explorer, providing support for dynamic tables, or the like.

Another series of instructions cause the processor 530 to provide an expert system 310, in accordance with embodiment of the present invention. The expert system 310 utilizes the database application to provide a control database 320, a rules database 330, and an operations database 340.

The expert system 310 also provides an initialization module 350 and a dynamic knowledge module 360. The expert system 310 also utilizes the web browser application to provide a user interface for dynamically manipulating the data structure and rules comprising the operations database 340. The web browser also provides a user interface for collecting operating parameters during application of the best-known processes to the project, product or the like. Finally, the web browser also provides a user interface for reporting one or more elements of the best known-process.

Accordingly, embodiments of the present invention advantageously provide a dynamically customizable expert system that is able to acquire and apply best-known processes to products, projects and the like. The data structure, set of rules and operating parameters comprising the best-known processes are dynamically modifiable. Embodiments of the present invention also advantageously provide a continuous improvement loop wherein knowledge acquired during execution of a product or process adds to the master database of knowledge.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An expert system comprising:
   a control database having a plurality of available data structures;
   a master rules database, coupled to said control database, having one or more of said plurality of available data structures populated with a plurality of corresponding rules;
   an operations database;
   an initialization module, communicatively coupled between said master rules database and said operations database, wherein said initialization module causes one or more of said plurality of available data structures populated with a plurality of corresponding rules to be copied from said master rules database such that a project database is formed in said operations database; and
   a dynamic knowledge module, communicatively coupled to said operations database, wherein said dynamic knowledge module causes a portion of a data structure of said project database to be modified;
   wherein said operations database comprises a first database within a second database and a third database within said second database, wherein:
      said first database comprises an extensible markup language (XML) database for capturing one or more operating parameters of said project;
      said second database stores said plurality of rules; and
      said third database stores said project data structure.

2. The expert system according to claim 1, wherein said dynamic knowledge module further causes one of said plurality of corresponding rules of said project database to be modified.

3. The expert system according to claim 1, wherein said dynamic knowledge module further causes an operating parameter, for capture by said project database, to be modified.

4. The expert system according to claim 1, wherein said plurality of corresponding rules are populated in each of said plurality of available data structures of said master rules database according to one or more categorizations comprising technology and timing.

5. The expert system according to claim 1, further comprising a continuous feedback loop module, communicatively coupled to said master rules database, wherein said continuous feedback loop module acquires knowledge as a function of modifying said data structure of said project database and adds said acquired knowledge to said master rules database.

6. The expert system according to claim 1, further comprising a continuous feedback loop module, communicatively coupled to said master rules database, wherein said continuous feedback loop module acquires knowledge as a function of modifying said corresponding rules of said project database and adds said acquired knowledge to said master rules database.

7. An expert system comprising:
a control database having a plurality of available data structures;
a master rules database, coupled to said control database, having one or more of said plurality of available data structures populated with a plurality of corresponding rules;
an operations database;
an initialization module, communicatively coupled between said master rules database and said operations database, wherein said initialization module causes one or more of said plurality of available data structures populated with a plurality of corresponding rules to be copied from said master rules database such that a project database is formed in said operations database;
a dynamic knowledge module, communicatively coupled to said operations database, wherein said dynamic knowledge module causes a portion of a data structure of said project database to be modified; and
a continuous feedback loop module, communicatively coupled to said master rules database, wherein said continuous feedback loop module acquires knowledge as a function of modifying said data structure of said project database and adds said acquired knowledge to said master rules database.

8. The expert system according to claim 7, wherein said dynamic knowledge module further causes one of said plurality of corresponding rules of said project database to be modified.

9. The expert system according to claim 7, wherein said dynamic knowledge module further causes an operating parameter, for capture by said project database, to be modified.

10. The expert system according to claim 7, wherein said operations database comprises a first database within a second database and a third database within said second database, wherein:
said first database comprises an extensible markup language (XML) database for capturing one or more operating parameters of said project;
said second database stores said plurality of rules; and
said third database stores said project data structure.

11. The expert system according to claim 7, wherein said plurality of corresponding rules are populated in each of said plurality of available data structures of said master rules database according to one or more categorizations comprising technology and timing.

12. The expert system according to claim 7, wherein said continuous feedback loop module further acquires knowledge as a function of modifying said corresponding rules of said project database and adds said acquired knowledge to said master rules database.

13. An expert system comprising:
a control database having a plurality of available data structures;
a master rules database, coupled to said control database, having one or more of said plurality of available data structures populated with a plurality of corresponding rules;
an operations database;
an initialization module, communicatively coupled between said master rules database and said operations database, wherein said initialization module causes one or more of said plurality of available data structures populated with a plurality of corresponding rules to be copied from said master rules database such that a project database is formed in said operations database;
a dynamic knowledge module, communicatively coupled to said operations database, wherein said dynamic knowledge module causes a portion of a data structure of said project database to be modified; and
a continuous feedback loop module, communicatively coupled to said master rules database, wherein said continuous feedback loop module acquires knowledge as a function of modifying said corresponding rules of said project database and adds said acquired knowledge to said master rules database.

14. The expert system according to claim 13, wherein said dynamic knowledge module further causes one of said plurality of corresponding rules of said project database to be modified.

15. The expert system according to claim 13, wherein said dynamic knowledge module further causes an operating parameter, for capture by said project database, to be modified.

16. The expert system according to claim 13, wherein said operations database comprises a first database within a second database and a third database within said second database, wherein:
said first database comprises an extensible markup language (XML) database for capturing one or more operating parameters of said project;
said second database stores said plurality of rules; and
said third database stores said project data structure.

17. The expert system according to claim 13, wherein said plurality of corresponding rules are populated in each of said plurality of available data structures of said master rules database according to one or more categorizations comprising technology and timing.

18. The expert system according to claim 13, wherein said continuous feedback loop module further acquires knowledge as a function of modifying said data structure of said project database and adds said acquired knowledge to said master rules database.

* * * * *